(12) United States Patent
Baba et al.

(10) Patent No.: US 11,448,571 B2
(45) Date of Patent: Sep. 20, 2022

(54) SPECIMEN COLLECTION TIP, SPECIMEN PREPARATION CONTAINER AND SPECIMEN PREPARATION KIT

(71) Applicant: NIPRO CORPORATION, Osaka (JP)

(72) Inventors: Toshiaki Baba, Osaka (JP); Koutarou Tanimura, Osaka (JP); Dosaku Tokudome, Osaka (JP); Yukihiro Yabe, Osaka (JP); Kanako Miura, Osaka (JP)

(73) Assignee: NIPRO CORPORATION, Osaka (JP)

( * ) Notice: Subject to any disclaimer, the term of this patent is extended or adjusted under 35 U.S.C. 154(b) by 135 days.

(21) Appl. No.: 16/312,387

(22) PCT Filed: Jul. 5, 2017

(86) PCT No.: PCT/JP2017/024606
§ 371 (c)(1),
(2) Date: Dec. 21, 2018

(87) PCT Pub. No.: WO2018/008672
PCT Pub. Date: Jan. 11, 2018

(65) Prior Publication Data
US 2019/0195749 A1    Jun. 27, 2019

(30) Foreign Application Priority Data

Jul. 6, 2016    (JP) .............................. JP2016-133950

(51) Int. Cl.
*B01L 3/00*    (2006.01)
*G01N 1/12*    (2006.01)
(Continued)

(52) U.S. Cl.
CPC ................ *G01N 1/12* (2013.01); *B01L 3/508* (2013.01); *B01L 3/5082* (2013.01); *B01L 3/565* (2013.01);
(Continued)

(58) Field of Classification Search
CPC .. G01N 1/12; G01N 1/02; G01N 1/14; G01N 1/38; G01N 2001/149; G01N 1/00;
(Continued)

(56) References Cited

U.S. PATENT DOCUMENTS 5,833,630 A    11/1998    Kloth
6,001,307 A    12/1999    Naka
(Continued)

FOREIGN PATENT DOCUMENTS

CN    101842702 A    9/2010
CN    102348507 A    2/2012
(Continued)

OTHER PUBLICATIONS

International Search Report for International Application No. PCT/JP2017/024606 dated Sep. 26, 2017, 5 pages.
(Continued)

*Primary Examiner* — Matthew D Krcha
*Assistant Examiner* — Sophia Y Lyle
(74) *Attorney, Agent, or Firm* — Edell, Shapiro & Finnan, LLC

(57) ABSTRACT

Provided is a specimen collection tip having a novel structure, with which it is possible to collect a trace amount of a specimen with good quantitative precision. Also provided is a specimen preparation container having a novel structure, with which it is possible to dilute and prepare the specimen collected with the specimen collection tip with good quantitative precision. A specimen collection tip 10, wherein a specimen holding region 12 having a predetermined volume is provided inside the specimen collection tip 10, and in a distal end portion extending from a support part 15, there is formed a specimen collection hole 22 and an air vent hole 24 placing the specimen holding region 12 in communication with a surface 23. Also, a specimen preparation container 26

(Continued)

with a cap 30, wherein the specimen collection tip 10 is attached to the cap 30 at the support part 15.

12 Claims, 7 Drawing Sheets

(51) Int. Cl.
  *G01N 1/00* (2006.01)
  *G01N 1/10* (2006.01)
  *G01N 1/02* (2006.01)
  *G01N 1/14* (2006.01)
  *G01N 1/38* (2006.01)

(52) U.S. Cl.
  CPC .................. *G01N 1/02* (2013.01); *G01N 1/14* (2013.01); *G01N 1/38* (2013.01); *B01L 2200/0689* (2013.01); *B01L 2300/042* (2013.01); *B01L 2300/0672* (2013.01); *B01L 2300/0809* (2013.01); *B01L 2300/0832* (2013.01); *B01L 2300/10* (2013.01); *B01L 2300/123* (2013.01); *B01L 2300/161* (2013.01); *B01L 2300/168* (2013.01); *G01N 2001/149* (2013.01)

(58) Field of Classification Search
  CPC ........ B01L 3/5082; B01L 3/508; B01L 3/565; B01L 2300/0672; B01L 2200/0689; B01L 2300/0832; B01L 2300/042; B01L 2300/0809; B01L 2300/10; B01L 2300/123; B01L 2300/161; B01L 2300/168
  See application file for complete search history.

(56) References Cited

U.S. PATENT DOCUMENTS

| | | | |
|---|---|---|---|
| 2004/0014237 A1 | 1/2004 | Sugiyama et al. | |
| 2005/0196872 A1 | 9/2005 | Nguyen | |
| 2007/0278097 A1* | 12/2007 | Bhullar | B29C 65/1645 |
| | | | 204/403.01 |
| 2010/0255460 A1* | 10/2010 | Kriz | B01L 3/50825 |
| | | | 435/5 |
| 2011/0011739 A1* | 1/2011 | Cui | C12Q 1/006 |
| | | | 204/403.1 |
| 2011/0020195 A1* | 1/2011 | Luotola | B01L 3/022 |
| | | | 422/512 |
| 2011/0033663 A1* | 2/2011 | Svec | C08J 5/00 |
| | | | 428/141 |
| 2012/0111130 A1 | 5/2012 | Telimaa | |
| 2012/0177543 A1* | 7/2012 | Battrell | B01L 3/502738 |
| | | | 422/187 |
| 2013/0062221 A1* | 3/2013 | Cai | G01N 27/3277 |
| | | | 205/780.5 |
| 2013/0143230 A1* | 6/2013 | Tolias | G01N 33/5008 |
| | | | 435/7.1 |

FOREIGN PATENT DOCUMENTS

| | | | | |
|---|---|---|---|---|
| EP | 2811299 A1 * | 12/2014 | ........ | B01L 3/502707 |
| JP | H10132712 A | 5/1998 | | |
| JP | H10508237 A | 8/1998 | | |
| JP | 3848201 A | 12/2003 | | |
| JP | 2006258773 A | 9/2006 | | |
| JP | 3848201 B2 | 11/2006 | | |
| JP | 2007527537 A | 9/2007 | | |
| JP | 2011503608 A | 1/2011 | | |
| JP | 2011169603 A | 9/2011 | | |
| JP | 2012066417 A | 4/2012 | | |
| JP | 2012132897 A | 7/2012 | | |
| JP | 2013181887 A | 9/2013 | | |
| WO | 2015034009 A1 | 3/2015 | | |
| WO | 2015177004 A1 | 3/2015 | | |
| WO | 2015034009 A1 | 11/2015 | | |
| WO | 2015177004 A1 | 11/2015 | | |

OTHER PUBLICATIONS

International Preliminary Report on Patentabiltiy for International Application No. PCT/JP2017/024606, dated Jan. 17, 2019, 7 pages.
First Office Action issued in Japanese Patent Application No. 2018-526411, dated Dec. 25, 2020 (19 pages).
First Office Action issued in Chinese Patent Application No. 201780039754.X , dated Dec. 1, 2020 (24 pages).
Second Office Action issued in Chinese Patent Application No. 201780039754.X dated Sep. 16, 2021, with English translation thereof, 22 pages.
Decision of Rejection in Chinese Application No. 201780039754.X, dated Feb. 14, 2022, 13 pages.

* cited by examiner

SPECIMEN COLLECTION TIP, SPECIMEN PREPARATION CONTAINER AND SPECIMEN PREPARATION KIT

CROSS REFERENCE TO RELATED APPLICATIONS

This application is 371 National Stage of International Application No. PCT/JP2017/024606, filed on Jul. 5, 2017, and claims priority under 35 U.S.C. § 119 to Application No. JP 2016-133950, filed on Jul. 6, 2016, the contents of which are incorporated by reference herein in their entirety.

TECHNICAL FIELD

The present invention relates to a specimen collection tip for quantitatively collecting a trace amount of a liquid specimen, as well as to a specimen preparation container and a specimen preparation kit for quantitatively diluting and preparing the specimen collected by the specimen collection tip.

BACKGROUND ART

Conventionally, for example, a specimen is collected for examination or testing, and components and their contents contained therein are analyzed and measured often. In such analysis and measurement, there are cases where a specimen is collected quantitatively and the specimen is prepared by quantitative dilution. Then, the diluted solution is dispensed into a test container such as a petri dish, and analysis, measurement or the like are carried out.

Incidentally, the work of diluting a specimen and dispensing the diluted liquid as a test liquid into a test container is very complicated, and as the number of specimens increases, it takes a huge amount of labor to perform dilution and dispensing, and human errors such as confusing specimens are likely to occur. Moreover, there was also a problem with its precision.

Therefore, in Japanese Patent No. JP-B-3848201 (Patent Document 1), an examination kit for facilitating dilution and dispensing work is proposed. That is, according to the examination kit, a cotton swab to which a specimen is adhered is immersed in a container filled with a diluting solution beforehand, and the specimen is diluted, and the diluted test liquid is dispensed into the test container as it is from a nozzle provided in the container so as to be used for analysis and measurement.

However, in the above-mentioned Patent Document 1, since a specimen is collected so as to be wiped off using a cotton swab at the time of collecting the specimen, quantitative collection of the specimen is almost impossible. Even if a specimen is collected quantitatively with a cotton swab, it is difficult to quantitatively recover the specimen penetrated into a fiber piece of the cotton swab at the time of dilution, for example. Accordingly, there is a risk that the fiber piece of the cotton swab may influence quantitative collection or dilution of a specimen, so that it was not realistic to use cotton swabs for quantitative test of specimens. Therefore, there is a demand for a device or the like capable of quantitatively collecting specimens and quantitatively recovering, diluting and preparing them or the like.

Especially when the dilution factor is large, for example, there is no choice but to collect a small amount of specimen, so that instruments or the like which can quantitatively and precisely collect a small amount of specimen have been demanded. In addition, in cases where the dilution factor is large, for example, multi-step dilution is sometimes performed, causing further human errors, worsening of precision, and the like.

As a method of collecting a small amount of specimen, it is conceivable to adopt a tubular body having a through hole with a small diameter like a capillary tube. That is, by immersing the opening part of the tubular body in the specimen, it is also possible to collect the specimen by sucking up the specimen into the through hole of the tubular body by capillary phenomenon. However, in a simple tubular body, quantitative collection of the specimen was difficult. Also, since the specimen is sucked up and rises to the portion grasped by the user, it is difficult to confirm the position of the liquid surface hidden behind the fingers of the user. In addition, there was a possibility that the specimen may leak out from the opening part on the side of the user's grasp, causing the user's fingers to become dirty.

BACKGROUND ART DOCUMENT

Patent Document

Patent Document 1: JP-B-3848201

SUMMARY OF THE INVENTION

Problem the Invention Attempts to Solve

The present invention has been made in view of the above circumstances, and it is an object of the present invention to provide a specimen collection tip having a novel structure capable of quantitatively and precisely collecting a trace amount of specimen.

Another object of the present invention is to provide a specimen preparation container and a specimen preparation kit having a novel structure which are able to quantitatively and precisely dilute and prepare specimens collected by the specimen collection tip.

Means for Solving the Problem

The above and/or optional objects of this invention may be attained according to at least one of the following preferred embodiments of the invention. The following preferred embodiments and/or elements employed in each preferred embodiment of the invention may be adopted at any possible optional combinations.

A first preferred embodiment of the present invention provides a specimen collection tip comprising: a specimen holding region having a predetermined volume and formed in an inside of the specimen collection tip; a support part; and a specimen collection hole and at least one air vent hole placing the specimen holding region in communication with a surface of the specimen collection tip in a distal end portion extending from the support part.

According to the specimen collection tip structured following this preferred embodiment, the specimen holding region of a predetermined volume is provided inside the specimen collection tip, and the specimen holding region is placed in communication with the surface through the specimen collection hole and the air vent hole. Thus, by bringing the opening part of the hole into contact with the liquid specimen, the specimen is sucked up into the specimen holding region through the specimen collection hole by the capillary phenomenon. In this way, by filling the specimen holding region with the specimen in the predetermined volume, it is possible to quantitatively and precisely collect the specimen.

Particularly, in the specimen collection tip, the support part is provided in a portion different from the specimen collection hole and the air vent hole. Thus, it is possible to bring the opening part of the specimen collection hole into contact with the specimen while pinching the support part with fingers, for example. Therefore, not only can the status of collection of the specimen be easily confirmed, but even if the specimen leaks out from the air vent hole, adhesion to the finger or the like is also avoided, so that handling of the specimen collection tip is facilitated.

A second preferred embodiment of the present invention provides the specimen collection tip according to the first preferred embodiment, wherein at least a portion of the surface is superhydrophobic.

According to the specimen collection tip structured following this preferred embodiment, at least a portion of the surface thereof is made superhydrophobic. Accordingly, even if the opening part of the specimen collection hole is brought into contact with the specimen, the specimen can be repelled without adhering to the surface of the tip. Therefore, since there is less possibility of collecting the specimen in a region other than the specimen holding region of the tip, the specimen can be collected more precisely and quantitatively.

A third preferred embodiment of the present invention provides the specimen collection tip according to the first or second preferred embodiment, wherein a portion where the specimen holding region is formed has a plate shape, and the specimen holding region is formed as a flat-shaped space.

According to the specimen collection tip structured following this preferred embodiment, since the specimen holding region is formed as a flat-shaped space, it is also possible to reduce the thickness dimension of the specimen holding region as well as to increase the length dimension thereof, for example. With this configuration, it is also possible to easily grasp the collection state of the specimen in comparison with the case where the length dimension of the specimen holding region is small. In particular, for example, by combining with the eighth preferred embodiment described later, it is possible to visually confirm the collection state of the specimen from the outside more easily.

A fourth preferred embodiment of the present invention provides the specimen collection tip according to any one of the first to third preferred embodiments, wherein a portion where the specimen holding region is formed has a laminated structure, and the specimen holding region is formed between laminated faces.

According to the specimen collection tip structured following this preferred embodiment, for example, three thin resin films are overlapped and fixed to one another to form a three-layer structure including an intermediate layer and front and back layers. By covering the space provided in the intermediate layer with the front and back layers from both sides, it is possible to constitute a specimen collection tip having a specimen holding region, a specimen collection hole and an air vent hole inside.

A fifth preferred embodiment of the present invention provides the specimen collection tip according to any one of the first to fourth preferred embodiments, wherein in the distal end portion, the specimen collection hole opens onto a distal end face, and the air vent hole opens onto a side peripheral face.

According to the specimen collection tip structured following this preferred embodiment, the specimen collection hole and the air vent hole are provided on different faces from each other. Thus, when the opening part of the specimen collection hole is brought into contact with the specimen, it is possible to avoid troubles of the air vent hole also being closed by the specimen and being incapable of sucking up the specimen into the specimen holding region or the like, thereby efficiently collecting the specimen.

A sixth preferred embodiment of the present invention provides the specimen collection tip according to any one of the first to fifth preferred embodiments, wherein the at least one air vent hole comprises a plurality of air vent holes formed in portions that are opposed to each other in a peripheral wall of the specimen holding region.

According to the specimen collection tip structured following this preferred embodiment, the plurality of air vent holes are provided in positions that are opposed to each other in the peripheral wall of the specimen holding region. Thus, for example, in a state in which the specimen is not sufficiently filled in the specimen holding region, it is possible to avoid the possibility that the specimen may leak out from the air vent hole on one side. In addition, it is possible to eliminate unevenness of the specimen held in the specimen holding region.

A seventh preferred embodiment of the present invention provides the specimen collection tip according to any one of the first to sixth preferred embodiments, wherein an inner face of the specimen holding region is hydrophilic.

According to the specimen collection tip structured following this preferred embodiment, since the inner face of the specimen holding region is made hydrophilic, the specimen easily enters the specimen holding region and is easily held in the specimen holding region. This configuration may improve the collection efficiency of the specimen by the specimen collection tip.

An eighth preferred embodiment of the present invention provides the specimen collection tip according to any one of the first to seventh preferred embodiments, wherein a peripheral wall of the specimen holding region is formed of a transparent resin material.

According to the specimen collection tip structured following this preferred embodiment, since the peripheral wall of the specimen holding region is formed of a transparent resin material, the state such as the liquid surface position of the specimen collected in the specimen holding region can be visually confirmed from the outside. Particularly, when the support part to be grasped by fingers and the specimen holding region are formed in different portions, the liquid surface position of the specimen is not hidden by the fingers, making it even easier to visually check from the outside.

A ninth preferred embodiment of the present invention provides the specimen collection tip according to any one of the first to eighth preferred embodiments, wherein an opening area of the air vent hole to the surface is larger than an opening area of the specimen collection hole to the surface.

According to the specimen collection tip structured following this preferred embodiment, the opening area of the air vent hole is made larger than the opening area of the specimen collection hole. Thus, the air within the specimen holding region is stably discharged, and the specimen can be quickly collected through the specimen collection hole.

A tenth preferred embodiment of the present invention provides a specimen preparation container with a cap comprising the specimen collection tip according to any one of the first to ninth preferred embodiments, the specimen collection tip being attached to the cap at the support part.

According to the specimen preparation container structured following this preferred embodiment, for example, a predetermined amount of diluting solution is filled in advance in a container main body constituting the specimen preparation container, and the container main body is covered with a cap to which the specimen collection tip after specimen collection is attached. By so doing, the specimen collection tip holding the specimen inside is accommodated in the specimen preparation container. By turning the specimen preparation container upside down or stirring the container in such a state, the diluting solution enters the specimen collection tip, and the collected specimen is discharged into the diluting solution. In this way, it is possible to prepare a test liquid by quantitatively diluting the specimen that is quantitatively collected with the specimen collection tip. In the present invention, the diluting solution includes a liquid for eluting and diluting the collected specimen, and is not limited to a liquid in which a solute such as a specimen is dissolved in a solvent, or the like.

Further, since the dilution is realized only by immersing the specimen collection tip in the diluting solution, even when the dilution factor is large, there is no need to perform multi-step dilution, and the dilution precision is sufficiently ensured as well. In particular, by adopting the specimen collection tip according to any one of the first to ninth preferred embodiments, even if the specimen is in a trace amount, quantitative collection is more reliably performed, thereby improving reliability of the test liquid after dilution.

By providing a nozzle to the cap of the specimen preparation container, for example, the test liquid can be dispensed (dropped) into the test container through the nozzle without removing the cap from the specimen preparation container.

An eleventh preferred embodiment of the present invention provides a specimen preparation kit comprising: the specimen collection tip according to any one of the first to ninth preferred embodiments; and a specimen preparation container with a cap, an inside of the container being filled with a predetermined amount of a specimen diluting solution.

According to the specimen preparation kit structured following this preferred embodiment, for example, a predetermined amount of diluting solution is filled in advance in a container main body constituting the specimen preparation container, and the specimen collection tip after specimen collection is put into the container main body. By so doing, the specimen collection tip holding the specimen inside is accommodated in the specimen preparation container. By turning the specimen preparation container upside down or stirring the container in such a state, the diluting solution enters the specimen collection tip, and the collected specimen is discharged into the diluting solution. In this way, it is possible to prepare a test liquid by quantitatively diluting the specimen that is quantitatively collected with the specimen collection tip. Besides, with this preferred embodiment as well, by providing a nozzle to the cap of the specimen preparation container, for example, the test liquid can be dispensed (dropped) into the test container through the nozzle without removing the cap from the specimen preparation container.

Effect of the Invention

According to the specimen collection tip structured following the present invention, even a trace amount of specimen can be quantitatively and precisely collected by utilizing the capillary phenomenon.

Further, according to the specimen preparation container or the specimen preparation kit including such a specimen collection tip, not only is high precision dilution realized, but also efficiency of dispensing work can be achieved when a nozzle is provided in the specimen preparation container.

EMBODIMENTS FOR CARRYING OUT THE INVENTION

Hereinafter, practical embodiments of the present invention will be described with reference to the drawings.

Figure 1:
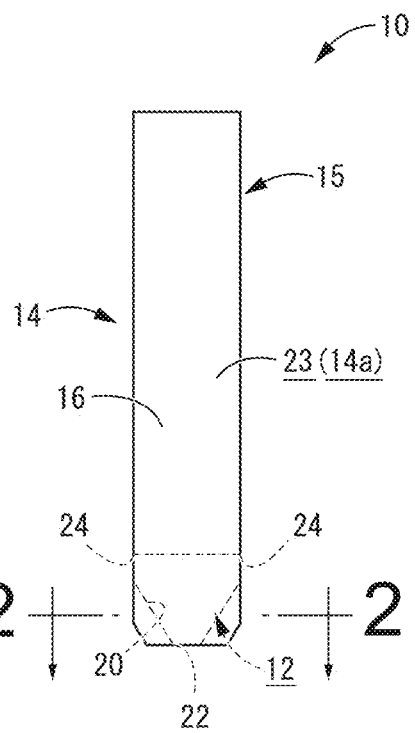
FIG. 1 is a plan view showing a specimen collection tip according to a first practical embodiment of the present invention.
Figure 2:
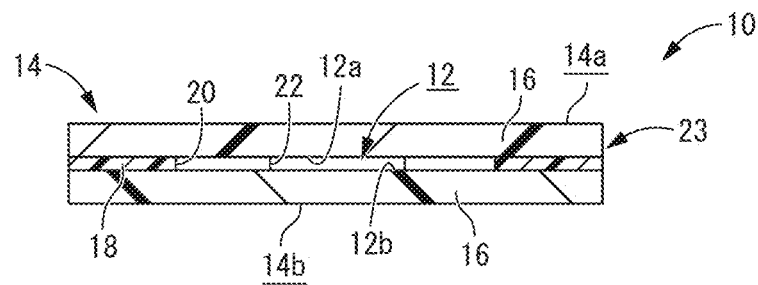
FIG. 2 is an enlarged transverse cross sectional view taken along line 2-2 of FIG. 1.

First, FIGS. 1 and 2 show a specimen collection tip 10 as a first practical embodiment of the present invention. The specimen collection tip 10 is capable of quantitatively collecting a liquid specimen, and specimens collected by the specimen collection tip 10 are diluted with, for example, a fixed amount of diluting solution so as to be used for analyses of components, tests of measuring the content, and the like. In the following description, the length direction refers to the vertical direction in FIG. 1. In addition, the distal end side refers to the lower side in FIG. 1, whereas the proximal end side refers to the upper side in FIG. 1.

Described more specifically, the specimen collection tip 10 includes an inside region 12 serving as a specimen holding region having a predetermined volume and formed in the inside thereof, and a wall part around the inside region 12 comprises a peripheral wall 14. This inside region 12 is provided only to the distal end portion of the peripheral wall 14. On the other hand, a portion of the peripheral wall 14 on the proximal end side where the inside region 12 is not provided serves as a support part 15, and also serves as a grasping part for grasping the specimen collection tip 10 with fingers. In other words, the inside region 12 is formed in the distal end portion of the specimen collection tip 10 extending from the support part 15.

The peripheral wall 14 is formed in a generally rectangular plate shape having a laminated structure of three layers overall, and two resin films 16 are laminated to each other with a double-sided tape 18 so as to be adhered. The double-sided tape 18 is formed by adhering an adhesive layer on both sides of a base material layer made of resin. The two resin films 16, 16 and the double-sided tape 18 are each formed in a rectangular shape having approximately the same shape, each of which is thin and flat. In this practical embodiment, since the corner portions on the distal end side of the peripheral wall 14 (resin films 16, 16 and double-sided tape 18) are cut out, the distal end side of the peripheral wall 14 is made narrower than the proximal end side thereof.

The double-sided tape 18 is provided with a groove part 20. The groove part 20 penetrates the double-sided tape 18 in the plate thickness direction, and in the present practical embodiment, in a plan view, the groove part 20 is a hexagon having a narrow width on the distal end side. The groove part 20 opens to the distal end face and both side faces of the double-sided tape 18, and the opening part on the distal end side of the groove part 20 is provided in the center portion in the width direction of the double-sided tape 18, while the opening parts on both sides of the groove part 20 are provided on the distal end side of the double-sided tape 18 so as to be opposed to each other in the width direction (lateral direction in FIG. 1) at the same position in the lengthwise direction. In the present practical embodiment, the width dimension of the opening part in the distal end face (dimension in the lateral direction in FIG. 1) and the width dimension of the opening parts on both side faces (dimension in the vertical direction in FIG. 1) are approximately equal.

By covering the opening parts on both sides in the plate thickness direction of the groove part 20 of the double-sided tape 18 with the respective resin films 16, 16, a tunnel-shaped passage is formed in the peripheral wall 14, and the tunnel-shaped passage constitutes the inside region 12. That is, since the inside region 12 is formed between the laminated faces of the resin films 16, 16 and includes the groove part 20 provided in the flat double-sided tape 18, the inside region 12 is also configured as a flat-shaped space.

Further, a specimen collection hole 22 for collecting a specimen is constituted by an opening part on the distal end side of the double-sided tape 18 (opening part on the distal end face of the peripheral wall 14), and the specimen collection hole 22 allows the inside region 12 and the external space to communicate with each other. On the other hand, air vent holes 24, 24 for discharging the air in the inside region 12 are constituted by the opening parts on both side faces of the double-sided tape 18 (opening parts on both side peripheral faces of the peripheral wall 14), and the air vent holes 24, 24 allow the inside region 12 and the external space to communicate with each other. That is, the inside region 12 is placed in communication with a surface 23 of the specimen collection tip 10 (peripheral wall 14) by the specimen collection hole 22 provided to the distal end, while being placed in communication with the surface 23 of the specimen collection tip 10 (peripheral wall 14) by the air vent holes 24, 24 provided to the proximal end. In the present practical embodiment, all of the specimen collection hole 22 and the air vent holes 24, 24 are provided further on the distal end side than the center in the lengthwise direction of the specimen collection tip 10.

Since the opening parts on both sides of the double-sided tape 18 constituting the air vent holes 24, 24 are formed at the positions opposed to each other in the width direction, the air vent holes 24, 24 are also opposed to each other in the width direction on both side faces of the peripheral wall 14.

In the present practical embodiment, one specimen collection hole 22 and two air vent holes 24, 24 having the opening parts of approximately the same size are provided. Thus, in total, the opening area of the air vent hole is larger than the opening area of the specimen collection hole.

The resin films 16, 16 are suitably formed of a synthetic resin material such as polyethylene terephthalate (PET), polypropylene, polyethylene (PE), polycarbon (PC), or ABS resin, for example. Particularly, in the present practical embodiment, by adopting any one of PET, PC, ABS resin and the like as the resin film 16, the peripheral wall 14 (specimen collection tip 10) is colored or colorless transparent.

In the present practical embodiment, with respect to the surface 23 of the peripheral wall 14, outer faces 14a, 14b on both sides in the plate thickness direction (both sides in the vertical direction in FIG. 2) are subjected to superhydrophobic treatment roughly over their entireties, so that liquid droplets do not adhere to the outer faces 14a, 14b. The term "superhydrophobic" means a state in which the contact angle between the face subjected to the superhydrophobic treatment and the droplet is 150° or greater. Such a superhydrophobic treatment is carried out, for example, by applying a compound having a saturated fluoroalkyl group, an alkylsilyl group, a fluorosilyl group, a long-chain alkyl group or the like on the outer faces 14a, 14b. Alternatively, for example, the resin films 16, 16 may be made of a material exhibiting superhydrophobicity, for example, a fluororesin or the like, so that the entire peripheral wall 14 exhibits superhydrophobicity.

On the other hand, in the present practical embodiment, with respect to the inner face of the inside region 12, inner faces 12a, 12b on both sides in the plate thickness direction are subjected to hydrophilic treatment, so that the liquid is easily held in the inside region 12. The term "hydrophilic" means a state in which the contact angle between the face subjected to the hydrophilic treatment and the droplet is 10° or smaller. Such a hydrophilic treatment is performed by, for example, applying a plasma treatment, a polymer exhibiting hydrophilicity, or the like on the inner faces of the inside region 12, that is, the mutually opposed faces 12a, 12b of the resin films 16, 16. Further, a hydrophilic treatment may be applied to the radially inner face of the groove part 20 of the double-sided tape 18. Polymers exhibiting hydrophilicity include polyethylene glycol, polyvinyl alcohol, and the like.

The specimen collection tip 10 subjected to such a superhydrophobic treatment and hydrophilic treatment can be preferably obtained by, for example, subjecting one face of the resin film 16 to superhydrophobic treatment while subjecting the opposite face thereof to hydrophilic treatment, then the two sheets of resin films 16, 16 being adhered with the double-sided tape 18 in a state in which the faces subjected to the hydrophilic treatment are opposed to each other.

With respect to the specimen collection tip 10 having such a structure, the user grasps the support part 15 and brings the distal end face of the specimen collection tip 10 into contact with a liquid specimen such as blood. By so doing, the specimen is sucked up into the inside region 12 through the specimen collection hole 22 by the capillary phenomenon, while the air within the inside region 12 is discharged through the air vent holes 24, 24. Accordingly, the specimen is collected by the specimen collection tip 10. A filter may be provided to the opening part of the air vent hole 24 to allow gas to pass therethrough and make it impossible for liquid to pass therethrough. By providing such a filter, the specimen can be prevented from leaking out from the air vent holes 24, 24.

Figure 3:
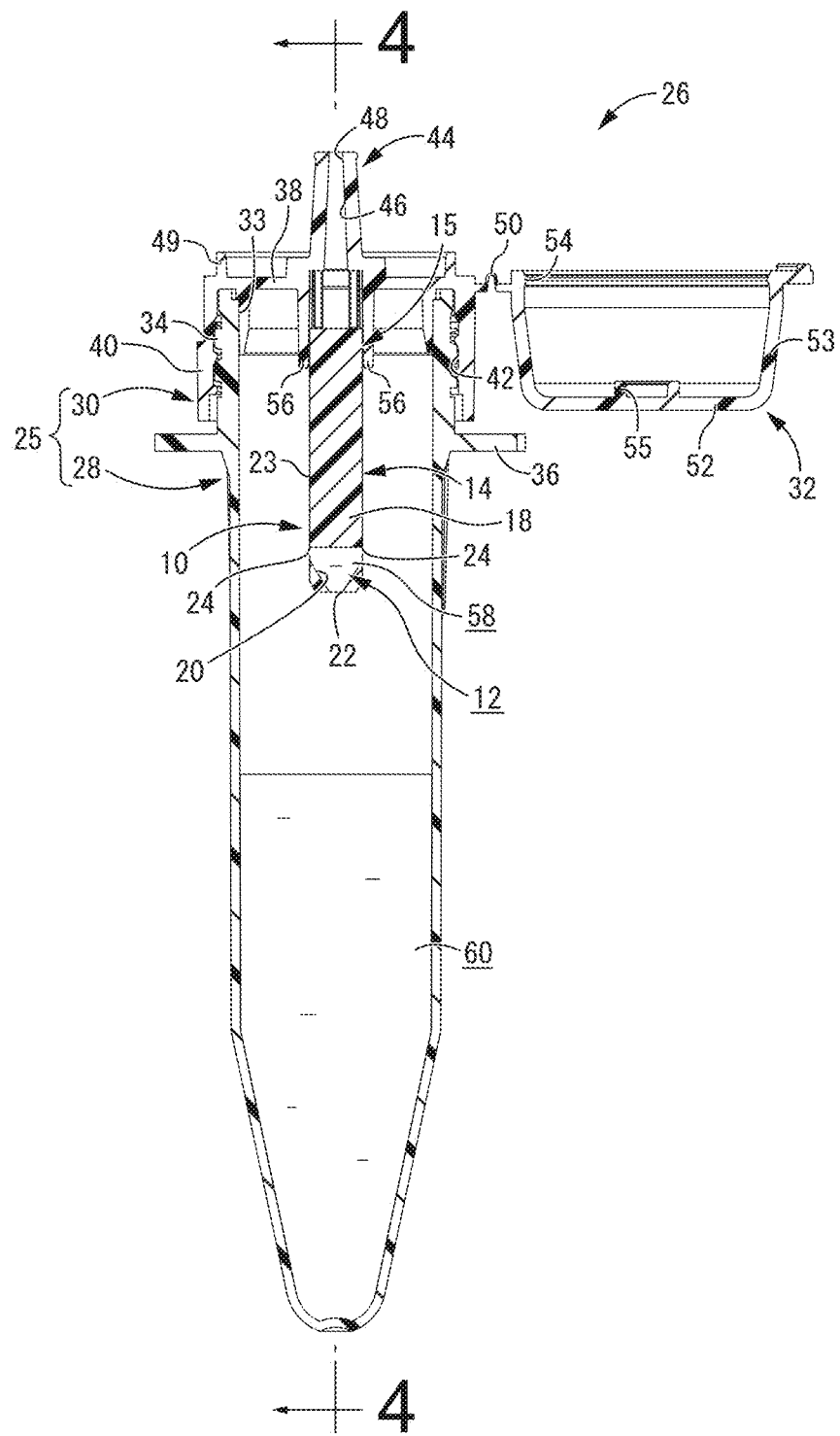
FIG. 3 is a vertical cross sectional view showing a specimen preparation container to which the specimen collection tip of FIG. 1 is attached, with an opening/closing lid thereof opened.
Figure 4:
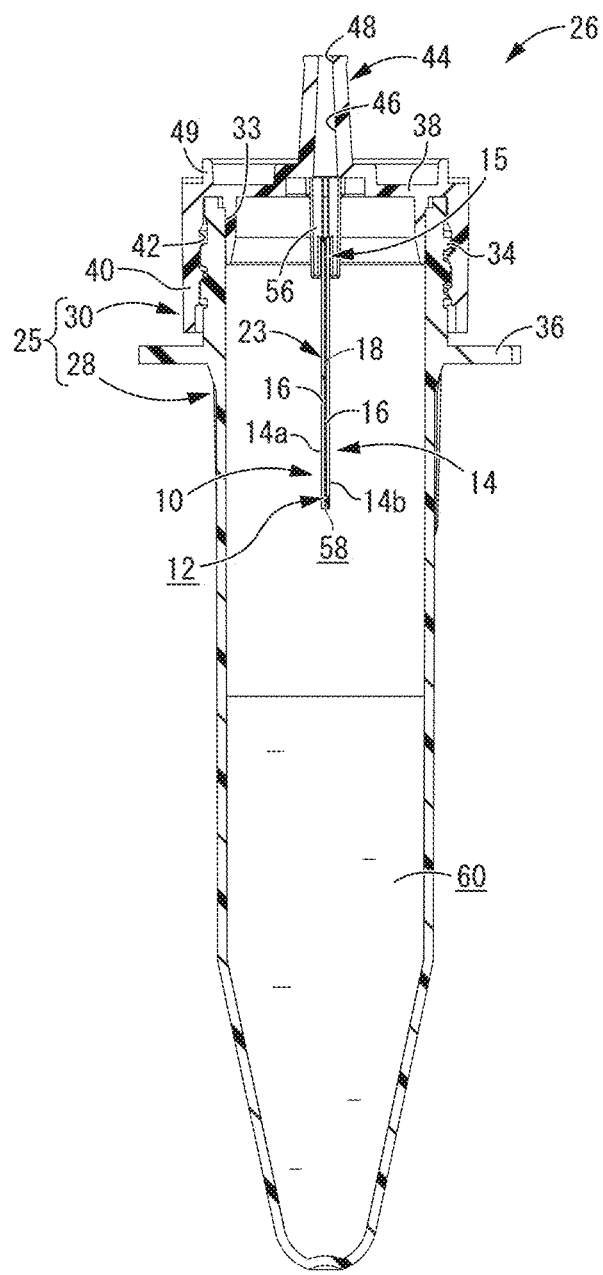
FIG. 4 is a cross sectional view taken along line 4-4 of FIG. 3.

Further, the specimen collection tip 10 by which the specimen is collected as described above is attached to a specimen preparation container main body 25 as shown in FIGS. 3 and 4, whereby a specimen preparation container 26 is constituted. By so doing, the specimen is diluted by the specimen preparation container 26. Specifically, the specimen preparation container main body 25 comprises a container main body 28 and a cap 30, and the specimen collection tip 10 is attached to the cap 30 and the cap 30 is screwed onto the container main body 28, so as to constitute the specimen preparation container 26. Incidentally, the cap 30 is provided with an opening/closing lid 32, and in FIGS. 3 and 4, the opening/closing lid 32 of the cap 30 is shown in an opened state.

Specifically, the container main body 28 has a bottomed tube shape, and a male thread 34 is formed on the outer circumferential surface of the distal end on the side where an opening part 33 is formed. Besides, a flange-shaped support piece 36 projecting annularly to the outer peripheral side is formed on the inner side of the male thread 34 in the axial direction (vertical direction in FIG. 3).

On the other hand, the cap 30 has a generally inverted, bottomed tubular shape overall. Specifically, the cap 30 includes a roughly circular top wall part 38 and a tubular part 40 projecting from the outer peripheral edge of the top wall part 38 to one axial side (downward in FIG. 3). A female thread 42 is formed on the radially inner face of the tubular part 40.

A nozzle part 44 extending to the other axial side (upward in FIG. 3) is provided at the center of the top wall part 38, and in the center of the nozzle part 44 and the top wall part 38, a through hole 46 is formed so as to penetrate in the axial direction. The protruding distal end of the nozzle part 44 serves as an outlet port 48 for discharging a test liquid 62 described later. The outer circumferential surface of the nozzle part 44 has a tapered face shape gradually decreasing in diameter toward the other axial side, while the radially inner face of the nozzle part 44 also has a tapered face shape gradually decreasing in diameter toward the other axial side. Thus, the nozzle part 44 has a generally constant thickness dimension across roughly the entire length.

Moreover, on the outer peripheral portion of the top wall part 38, formed is an annular mating tube part 49 protruding to the other axial side.

Further, on the outer peripheral surface of the cap 30, the opening/closing lid 32 is connected via a hinge part 50 to a portion of the circumference (right side in FIG. 3). The opening/closing lid 32 has a bottomed tube shape or a cup shape having a size capable of covering the nozzle part 44, that is, includes a bottom wall part 52 and a tubular peripheral wall part 53 extending from the outer peripheral edge of the bottom wall part 52. An annular rib 54 is provided on the radially inner face of the opening part of the peripheral wall part 53. On the other hand, an engaging tube part 55 projects inward of the opening/closing lid 32 from the center of the bottom wall part 52. The inside diameter dimension of the engaging tube part 55 is approximately equal to the outside diameter dimension of the outlet port 48 in the nozzle part 44.

With this configuration, by bending the hinge part 50, the nozzle part 44 is covered from the outside by the opening/closing lid 32 (bottom wall part 52 and peripheral wall part 53), and the annular rib 54 provided on the radially inner face of the peripheral wall part 53 is brought into pressure contact with the mating tube part 49 provided on the top wall part 38, so as to close the opening/closing lid 32. In such a state, the outlet port 48 of the nozzle part 44 is inserted into the engaging tube part 55 so that the outlet port 48 is stably closed off.

Here, from the center of the top wall part 38, a pair of fixing plate parts 56, 56 project toward one axial side. The fixing plate parts 56, 56 are provided on the opposite sides of the through hole 46 at the center of the top wall part 38. The width dimension (dimension in the lateral direction in FIG. 4) of each fixing plate part 56 is made roughly equal to the inside diameter dimension of the through hole 46 of the top wall part 38. The distance between the opposed faces of the fixing plate parts 56, 56 is made roughly equal to the width dimension of the support part 15 of the specimen collection tip 10. With this configuration, by inserting the support part 15 of the specimen collection tip 10 between the fixing plate parts 56, 56, the specimen collection tip 10 is fixed to the cap 30.

Hereinafter, procedures for collecting, diluting and dropping (dispensing) the specimen using the specimen collection tip 10 and the specimen preparation container 26 are shown.

First, a specimen 58, the specimen collection tip 10, the cap 30, and the container main body 28 are prepared. A predetermined amount of a diluting solution 60 for diluting the specimen 58 is put in the container main body 28 in advance, and the opening part 33 is sealed off with an aluminum foil or the like.

As such a diluting solution 60, for example, water, maximum recovery diluent (peptone saline diluent), buffered peptone water, phosphate buffered saline or the like can be suitably adopted. The diluting solution 60 is a liquid for eluting and diluting the specimen 58, and does not necessarily mean a liquid in which a solute is dissolved in a solvent, such as water.

Then, the support part 15 of the specimen collection tip 10 is fixed by being inserted between the fixing plate parts 56, 56 of the cap 30. Subsequently, the cap 30 is held by the fingers, and the distal end face of the specimen collection tip 10 is brought into contact with the specimen 58, thereby collecting the specimen 58 so as to be held in the inside region 12. In this way, by attaching the cap 30 to the specimen collection tip 10 before the specimen collection, it is easy to hold the proximal end side of the specimen collection tip 10 with fingers, and good operation efficiency is exhibited.

It would also be acceptable to use the specimen collection tip 10 by itself, so as to collect the specimen 58 by grasping the support part 15 with the fingers and bringing the distal end face of the specimen collection tip 10 into contact with the specimen 58. In that case, after collecting the specimen 58 with the specimen collection tip 10 by itself and holding the specimen 58 in the inside region 12, the support part 15 of the specimen collection tip 10 can be inserted and fixed between the fixing plate parts 56, 56 of the cap 30.

Subsequently, the aluminum foil of the container main body 28 is peeled off, and the female thread 42 of the cap 30 is screwed together with the male thread 34 of the container main body 28 to fix the cap 30, to which the specimen collection tip 10 is attached, to the container main body 28. Before or after fixing the specimen collection tip 10, the cap 30 is covered by the opening/closing lid 32, and the outlet port 48 is held in the closed state. By so doing, the accommodating region inside the container main body 28 that accommodates the diluting solution 60 and the specimen collection tip 10 is made fluid-tight with respect to the external space.

The specimen preparation container 26 in this state is mixed by being turned upside down or stirred. Accordingly, the diluting solution 60 enters and exits through the specimen collection hole 22 and the air vent holes 24, 24 of the specimen collection tip 10, so that the specimen 58 is diffused into the diluting solution 60. That is, the specimen collection hole 22 and the air vent holes 24, 24 are also used as specimen discharging holes at the time of mixing. Through such mixing operation, the dilution of the specimen 58 is completed. Specifically, by the specimen 58 being diluted with the diluting solution 60, the test liquid 62 (see FIG. 5 described later) is prepared. When the specimen preparation container 26 is turned upside down, it is preferable that the inside region 12 of the specimen collection tip 10 does not protrude from the liquid surface of the diluting solution 60 (test liquid 62). By so doing, the specimen 58 can be reliably diffused into the diluting solution 60.

Figure 5:
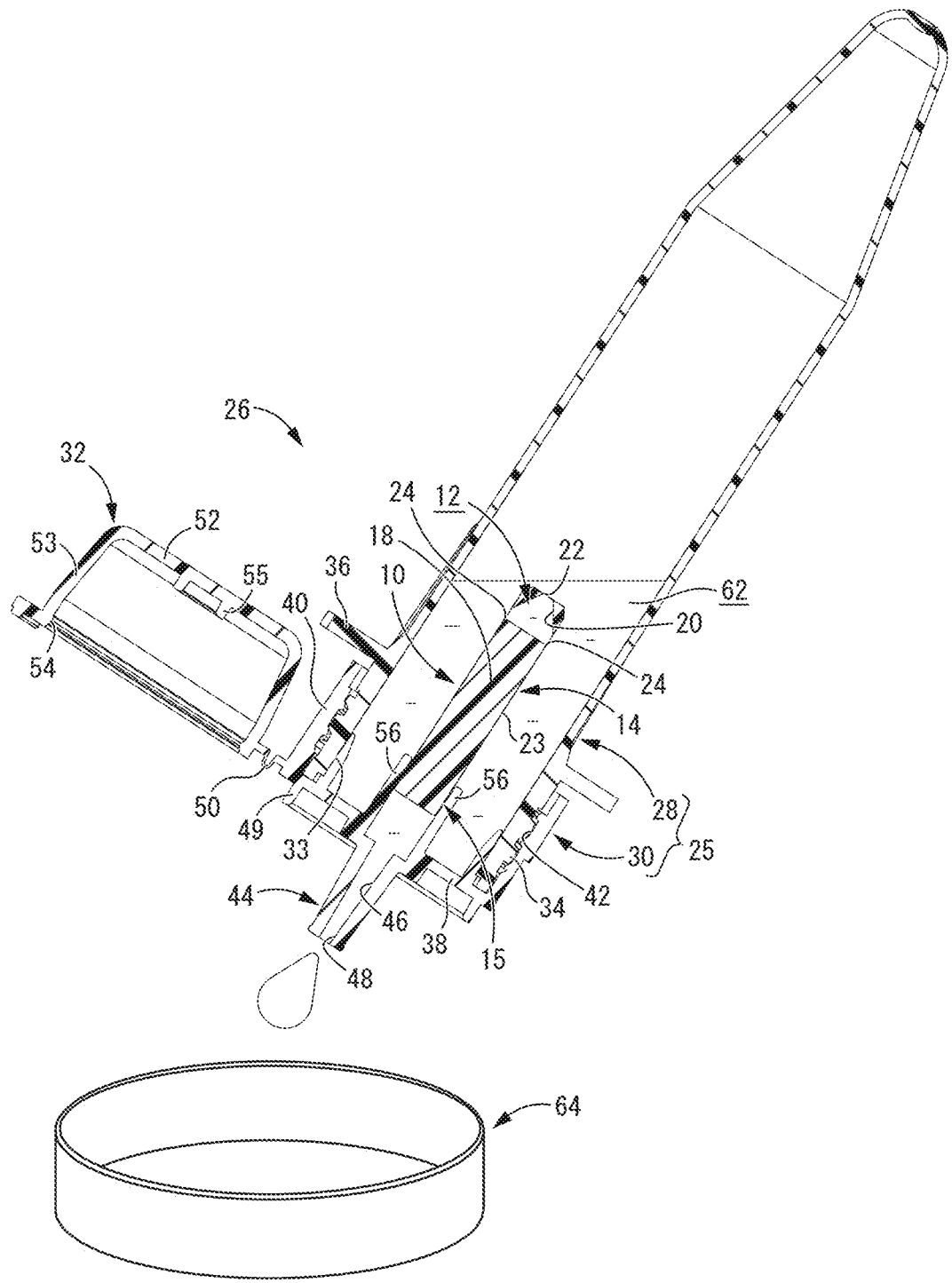
FIG. 5 is a view suitable for explaining a state in which a test liquid is dropped by using the specimen preparation container of FIG. 3.

Thereafter, the opening/closing lid 32 of the cap 30 of the specimen preparation container 26 is opened, as shown in FIG. 5, and the specimen preparation container 26 is turned upside down above a test container 64 such as a petri dish. Accordingly, the test liquid 62 is dropped (dispensed) onto the test container 64 from the outlet port 48 through between the fixing plate parts 56, 56 and the through hole 46 of the nozzle part 44.

Then, using the test liquid 62 dropped (dispensed) on the test container 64, a test such as component analysis, content measurement, or the like is carried out. As a test container, in addition to a petri dish, a test strip or the like can also be adopted.

With the specimen collection tip 10 having the structure as described above, the inside region 12 having a predetermined volume is formed, and the inside region 12 is placed in communication with the surface 23 (external space) through the specimen collection hole 22 and the air vent holes 24, 24. Thus, by the specimen collection hole 22 being brought into contact with the specimen 58, specimen 58 is sucked up by the capillary phenomenon into the inside region 12 formed with a predetermined volume. By so doing, even a trace amount of the specimen 58 can be collected quantitatively.

Furthermore, by imparting superhydrophobicity to the outer peripheral surface of the peripheral wall 14, adhesion of the specimen 58 to the surface 23 of the peripheral wall 14 is avoided, and no excessive specimen is collected. This makes it possible to quantitatively collect the specimen 58 in a more reliable manner. In addition, since hydrophilicity is imparted to the radially inner face of the inside region 12, the specimen 58 easily enters the inside region 12, thereby improving the collection efficiency.

In addition, the specimen collection tip 10 is provided with the support part 15 and can be used by grasping the support part 15 with fingers or the like, thereby improving ease of handling of the specimen collection tip 10. That is, the inside region 12 is provided on the distal end side of the specimen collection tip 10. Thus, by grasping the support part 15 on the proximal end side, it is possible to easily confirm the state of collection of the specimen 58. Furthermore, since the air vent holes 24, 24 open to the distal end side of the specimen collection tip 10, even if the specimen 58 leaks out from the air vent holes 24, 24, the fingers of the user do not become dirty.

Furthermore, the inside region 12 is formed as a flat-shaped space, and in particular, its lengthwise dimension is made large. In addition, since the peripheral wall 14 is made transparent, when the specimen 58 is collected, a state in which the liquid surface of the specimen 58 rises in the inside region 12 can be easily observed visually from the outside. Therefore, it is possible to reduce the possibility that the collection is interrupted in a state where the specimen 58 is not sufficiently collected or the like, for example.

Particularly, in the present practical embodiment, the specimen collection hole 22 and the air vent holes 24, 24 are provided on different faces of the specimen collection tip 10 from each other. Thus, the air vent holes 24, 24 will not be closed off by the specimen 58, thereby realizing collection of the specimen 58 in a more reliable manner. Further, since the opening areas of the air vent holes 24, 24 are also sufficiently obtained, the specimen 58 can be collected quickly.

Further, the peripheral wall 14 has a three-layer laminated structure comprising the double-sided tape 18 and the resin films 16, 16. This makes it possible to form the inside region 12, the specimen collection hole 22, and the air vent holes 24, 24 with a simple structure in which the double-sided tape 18 is provided with the groove part 20 and the resin films 16, 16 are affixed thereto.

Moreover, with the specimen preparation container 26 as described above, the specimen 58 quantitatively collected is diluted with the predetermined amount of the diluting solution 60, whereby the specimen 58 can be quantitatively diluted. In particular, since such dilution is carried out in one step, the risk of human errors or deterioration in precision can be reduced.

In particular, since the inside diameter of the nozzle part 44 provided to the cap 30 is gradually reduced toward the outside, when the test liquid 62 is dispensed into the test container 64, the test liquid 62 is dropped in a state of droplets. In particular, by adopting such a shape, it is possible to make an amount of one droplet to be dropped roughly constant, so that quantitative tests can be performed more precisely.

Although the practical embodiment of the present invention have been described above, the present invention is not limitedly interpreted based on the specific description in the practical embodiment, but may be embodied with various changes, modifications and improvements which may occur to those skilled in the art.

Figure 6:
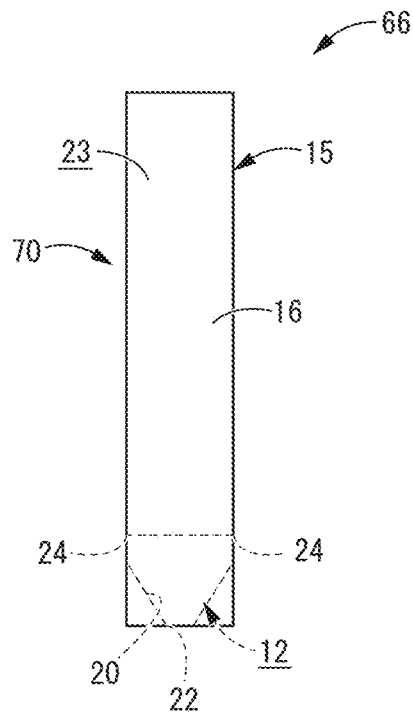
FIG. 6 is a plan view showing a specimen collection tip as another practical embodiment of the present invention, corresponding to FIG. 1.
Figure 7:
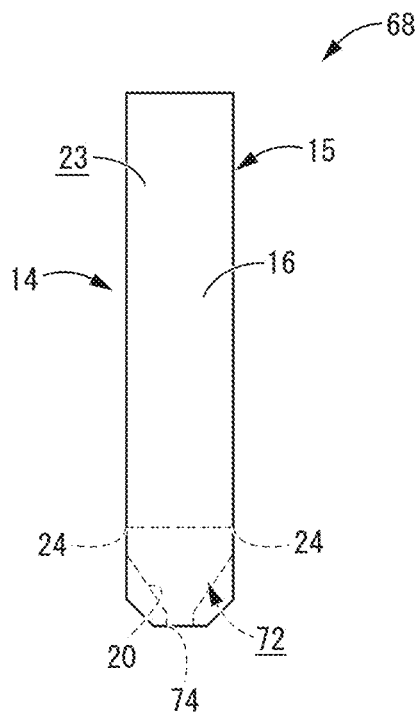
FIG. 7 is a plan view showing a specimen collection tip as yet another practical embodiment of the present invention, corresponding to FIG. 1.

For example, the specimen collection tip is not limited to the shape as in the above practical embodiment, and a specimen collection tip 66 shown in FIG. 6 and a specimen collection tip 68 shown in FIG. 7 can also be adopted. Specifically, in the specimen collection tip 66 shown in FIG. 6, the corner portions of the distal end portion of a peripheral wall 70 are not cut out, and the width dimension of the peripheral wall 70 (specimen collection tip 66) is generally constant across the entire length in the lengthwise direction. The specimen collection tip 66 having such a shape can also exhibit the same effects as those of the specimen collection tip 10 in the above practical embodiment. However, as in the above-described practical embodiment, by cutting out the corner portions of the peripheral wall 14 and making the width dimension on the distal end side smaller than that of the proximal end side, when the distal end face of the specimen collection tip 10 is brought into contact with the specimen, the contact area with the specimen at the distal end face is made small and the amount of specimen adhered to the distal end face is minimized, so that more quantitative specimen collection becomes possible. In this way, the shape of the peripheral wall (specimen collection tip) is not limited at all.

In the specimen collection tip 68 shown in FIG. 7, a specimen collection hole 74 placing an inside region 72 in communication with the surface 23 (external space) is formed with a predetermined length dimension. In this way, the specimen collection hole and the air vent hole may have a predetermined length dimension, and the shape of the inside region (specimen holding region) is not limited at all. When the specimen collection hole and the air vent hole have a predetermined volume like the specimen collection hole 74 shown in FIG. 7, the specimen holding region having a predetermined volume comprises not only the inside region but also the specimen collection hole and the air vent hole together.

Figure 8:
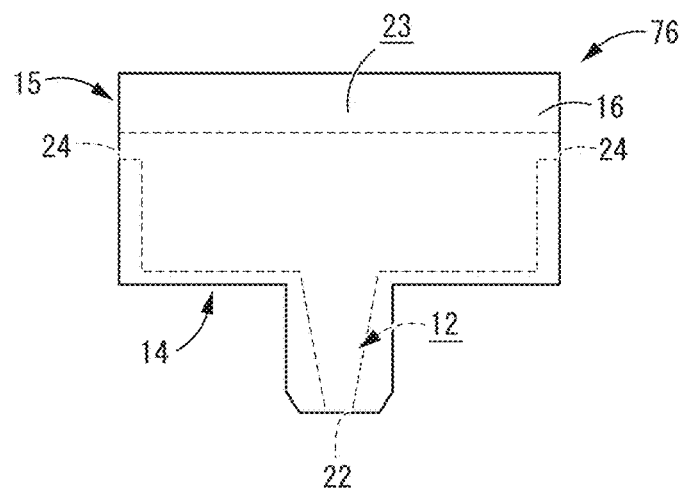
FIG. 8 is a plan view showing a specimen collection tip as still yet another practical embodiment of the present invention, corresponding to FIG. 1.
Figure 9:
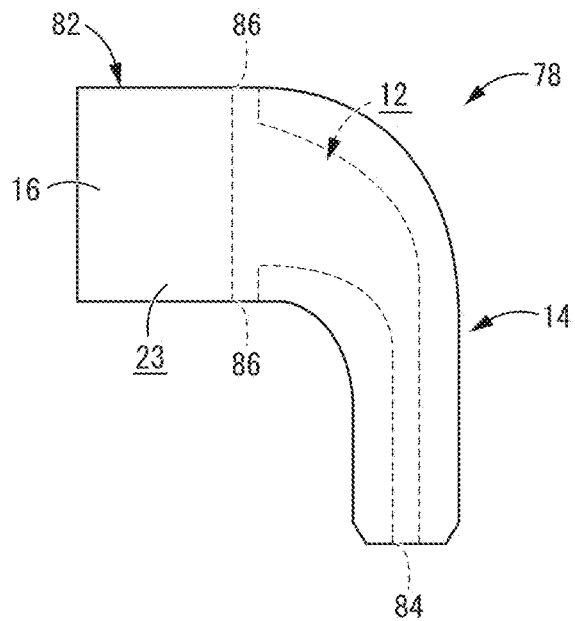
FIG. 9 is a plan view showing a specimen collection tip as a further practical embodiment of the present invention, corresponding to FIG. 1.
Figure 10:
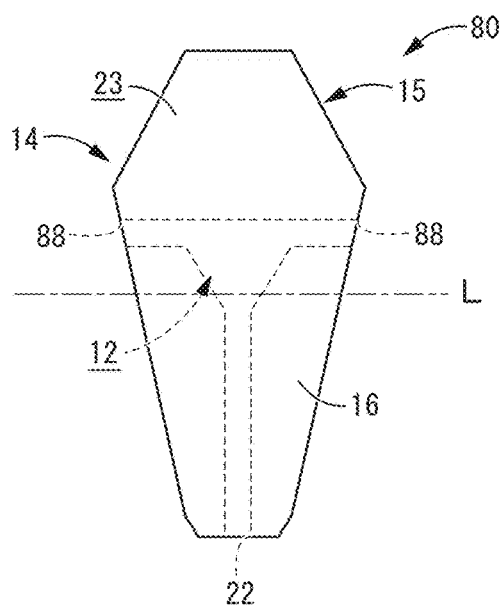
FIG. 10 is a plan view showing a specimen collection tip as a yet further practical embodiment of the present invention, corresponding to FIG. 1.

Further, specimen collection tips 76, 78, 80 having shapes as shown in FIGS. 8 to 10, for example, may also be adopted. Specifically, whereas the specimen collection tip 10 of the preceding practical embodiment has an elongated, generally rectangular shape with the vertical direction in FIG. 1 being the lengthwise direction, the specimen collection tip 76 shown in FIG. 8 includes a wide proximal end portion and a narrow distal end portion with a stepped part positioned in between at the vertically medial portion in the drawing. The distal end portion where the specimen collection hole 22 opens is narrowed to facilitate specimen collection, while the specimen holding region 12 is formed so as to extend to the inside of the wide proximal end portion, thereby easily obtaining a sufficient volume of the specimen holding region 12.

In the above practical embodiment, the specimen collection tip 10 has an overall shape extending in a linear pattern, but the overall shape thereof is not limited at all. For example, like the specimen collection tip 78 shown in FIG. 9, the overall shape thereof may be curved at the medial portion in the lengthwise direction. That is, in the present preferred embodiment, the lengthwise direction refers to the direction that is directed from the left side to the right side in FIG. 9, then curves downward in the center axis direction, for example. On the proximal end side (left side in FIG. 9), a support part 82 is provided at a portion extending in the lateral direction in the drawing, and on the distal end side (right side in FIG. 9) curving from the support part 82 and extending downward, the specimen holding region 12, a specimen collection hole 84, and air vent holes 86, 86 are provided. In this way, the specimen collection tip may curve, bend, or the like.

Furthermore, as can be seen from the preferred embodiments shown in FIGS. 8 to 10, the distal end side on which the specimen collection holes 22, 84 and the air vent holes 24, 86, 88 are formed may be set over a region that is not less than half of the specimen collection tips 76, 78, 80 in the lengthwise direction toward the proximal end side. Specifically, as shown in FIG. 10, the region extending further than the lengthwise center line (straight line L) to the proximal end side may be defined as the distal end side where the specimen collection hole 22 and the air vent holes 88, 88 in the present invention are formed. Besides, a portion where the specimen collection hole 22 and the air vent hole 24 are formed is referred to as the distal end side, and the specimen holding region 12 may be formed to extend further to the proximal end side than the air vent hole 24.

In the above-described practical embodiment, the inner faces 12a, 12b of the inside region 12 are provided with hydrophilicity. However, when the specimen collection hole or the air vent hole has a predetermined volume, instead of or in addition to the inner face of the inside region, the inner face of the specimen collection hole or the air vent hole may be subjected to hydrophilization treatment, so as to be imparted with hydrophilicity.

It is preferable that superhydrophobicity be applied to at least a portion of the surface of the specimen collection tip (peripheral wall), and in the above practical embodiment, with respect to the surface 23 of the peripheral wall 14, the outer faces 14a, 14b on both sides in the plate thickness direction are imparted with superhydrophobicity roughly over their entireties. However, for example, it would also be acceptable to impart superhydrophobicity only to the portion of the surface of the specimen collection tip which may come into contact with the specimen, or to the surface of the peripheral wall generally over its entirety. Besides, in the above practical embodiment, with respect to the inner face of the inside region 12, the inner faces 12a, 12b on both sides in the plate thickness direction are imparted with hydrophilicity. However, for example, it would also be acceptable to impart hydrophilicity to the inner face of the inside region generally over its entirety. However, in the present invention, it is not necessary to impart such superhydrophobicity or hydrophilicity. It would also be possible to make the surface of the peripheral wall oil-repellent or make the inner face of the inside region oleophilic according to the properties of the specimen.

Furthermore, in the above-described practical embodiment, the inside region 12 is provided on the distal end side of the peripheral wall 14 which is the opposite side to the support part 15, but the position, size, shape, and the like of the inside region (specimen holding region) is not limited at all. That is, it is acceptable as long as the specimen collection hole and the air vent hole placed in communication with the specimen holding region open to the distal end side which is the opposite side to the support part, and in any of the preferred embodiments shown in the above practical embodiment and FIGS. 6 to 10, the specimen holding region may extend to the support part, namely, the specimen holding region may be provided inside the support part. In addition, the shape of the peripheral wall (specimen collection tip) is not limited to the rectangular shape as in the above practical embodiment either, but may be a circular shape (including an oval or an ellipse), a polygonal shape, a combination of these, or the like.

In the above practical embodiment, the specimen collection hole 22 opens onto the distal end face of the peripheral wall 14 and the air vent holes 24 open onto both side faces of the peripheral wall 14. However, for example, it would also be acceptable that the hole opening onto one side face of the peripheral wall serves as the specimen collection hole, while the hole opening onto the distal end face and the hole opening onto the other side face of the peripheral wall serve as the air vent holes. Therefore, as long as the specimen collection hole and the air vent hole open to further on the distal end side than the support part, the opening position, shape, size, number, etc. are not limited. Furthermore, in the above practical embodiment, the opening parts of the specimen collection hole 22 and the air vent holes 24, 24 are provided in the double-sided tape 18. However, the opening parts of the specimen collection hole and the air vent holes may be provided on the resin film.

Moreover, in the above practical embodiment, the peripheral wall 14 has a three-layer laminated structure of the resin films 16, 16 and the double-sided tape 18 having the groove part 20 over its entirety, but the present invention is not limited to such a mode. That is, the present invention can be realized as long as it is a hollow structural body having a specimen holding region therein, and even in the case of adopting a laminated structure of resin films as in the above practical embodiment, the double-sided tape 18 is not essential. For example, it would also be acceptable to form a concave part in one of or both of the overlapped faces of the resin films, and overlap these two resin films and fix them to each other by adhesion, welding or the like so as to cover the concave part, thereby forming the specimen holding region, the specimen collection hole, and the air vent hole. Therefore, the peripheral wall may have a two-layer structure, for example, or may alternatively have three or more layers in which two or more specimen holding regions are formed between overlapped faces of the front layer and the intermediate layer, and between overlapped faces of the intermediate layer and the back layer, or the like. Besides, it would also be possible to form the region for forming the specimen holding region or the like as a laminated structure of the resin films, and to form the support part of a single member, or the like.

Figure 11:
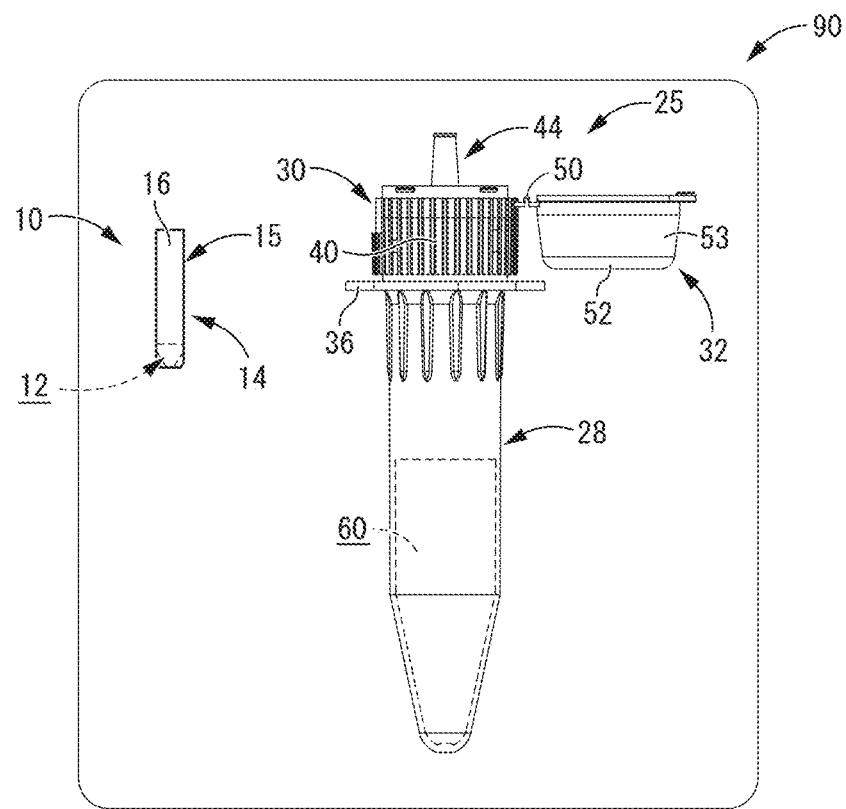
FIG. 11 is a view suitable for explaining a specimen preparation kit including the specimen collection tip of FIG. 1.

Furthermore, the specific structure of the specimen preparation container is not limited at all. For example, in the preceding practical embodiment, the specimen collection tip 10 is configured to be fixed to the cap 30 of the specimen preparation container main body 25, but the present invention is not limited to such a mode. That is, the fixing plate parts for fixing the specimen collection tip to the cap is not essential. For example, the specimen collection tip with the specimen collected and held therein may be directly immersed in a diluting solution filled in the container main body in advance so as to release the specimen into the diluting solution, or the like. Further, in the present invention, as shown in FIG. 11, for example, the specimen collection tip 10 and the specimen preparation container main body 25 in which a predetermined amount of the diluting solution 60 is filled may be simultaneously packaged so as to be manufactured, sold, used, or the like as a specimen preparation kit 90. There may be a case in which, for example, it is difficult to screw the cap 30 of the specimen preparation container main body 25 onto the container main body 28 which is filled with the diluting solution 60 and whose opening part 33 is sealed, because of formation of the fixing plate parts 56 or the like protruding inward of the container. In such a case, packaging can be performed with the cap 30 removed from the container main body 28.

Additionally, the opening/closing lid and the nozzle part provided to the cap are not essential. Specifically, it would also be acceptable to close the container main body with the cap, and after mixing and diluting, to remove the cap again and dispense the test liquid into the test container.

The specimen is not limited in any way as long as it is liquid, and includes bodily fluids and mucus such as blood, urine, sweat, or saliva of a living body, as well as water of river, pond etc., various drinks, and the like.

KEYS TO SYMBOLS

10, 66, 68, 76, 78, 80: specimen collection tip, 12, 72: inside region (specimen holding region), 12a, 12b: inner face (opposed faces), 14, 70: peripheral wall, 14a, 14b: outer face, 15, 82: support part, 22, 74, 84: specimen collection hole, 23: surface, 24, 86, 88: air vent hole, 25: specimen preparation container main body, 26: specimen preparation container, 44: nozzle part, 60: diluting solution, 90: specimen preparation kit

The invention claimed is:

1. A specimen collection tip comprising:
    a peripheral wall formed in a generally rectangular plate shape and having a laminated structure including a base material layer disposed between two film layers;
    a specimen holding region having a predetermined volume and formed by a groove part that penetrates the base material layer in a thickness direction;
    a support part at a proximal end portion of the peripheral wall; and
    wherein the groove part opens to a distal end face and at least one side face of the base material layer to form a specimen collection hole and at least one air vent hole, respectively, placing the specimen holding region in communication with a surface of the specimen collection tip in a distal end portion extending from the support part;
    wherein an opening area of the at least one air vent hole to the surface is larger than an opening area of the specimen collection hole to the surface;
    wherein the at least one air vent hole is disposed between the specimen collection hole and the support part in a lengthwise direction;
    wherein the specimen holding region expands widthwise along an entire length of the specimen holding region from the specimen collection hole to the at least one air vent hole; and
    wherein the specimen holding region is configured to suck up a specimen into the specimen holding region through the specimen collection hole by capillary phenomenon when the distal end face of the base material layer is brought into contact with the specimen.

2. The specimen collection tip according to claim 1, wherein at least a portion of the surface of the specimen collection tip is superhydrophobic.

3. The specimen collection tip according to claim 1, wherein the specimen holding region is formed as a flat-shaped space.

4. The specimen collection tip according to claim 1, wherein the at least one air vent hole comprises a plurality of air vent holes formed in portions that are opposed to each other in a respective side faces of the base material layer of the peripheral wall.

5. The specimen collection tip according to claim 1, wherein an inner face of the specimen holding region is hydrophilic.

6. The specimen collection tip according to claim 1, wherein the peripheral wall of the specimen holding region is formed of a transparent resin material.

7. The specimen collection tip according to claim 1, further comprising a filter provided in the opening part of the at least one air vent hole to allow gas to pass therethrough and make it impossible for liquid to pass therethrough.

8. The specimen collection tip according to claim 1, wherein the specimen holding region comprises a hexagonal shape.

9. A specimen preparation container with a cap comprising the specimen collection tip according to claim 1, the specimen collection tip being attached to the cap at the support part.

10. A specimen preparation kit comprising:
    the specimen collection tip according to claim 1; and
    a specimen preparation container with a cap, an inside of the container being filled with a predetermined amount of a specimen diluting solution.

11. A specimen collection tip comprising:
    a peripheral wall formed in a generally rectangular plate shape and having a laminated structure including a base material layer disposed between two film layers;
    a specimen holding region having a predetermined volume and formed by a groove part that penetrates the base material layer in a thickness direction;
    a support part at a proximal end portion of the peripheral wall; and
    wherein the groove part opens to a distal end face and at least one side face of the base material layer to form a specimen collection hole and at least one air vent hole, respectively, placing the specimen holding region in communication with a surface of the specimen collection tip in a distal end portion extending from the support part;

wherein an opening area of the at least one air vent hole to the surface is larger than an opening area of the specimen collection hole to the surface;

wherein the at least one air vent hole is disposed between the specimen collection hole and the support part in a lengthwise direction;

wherein the specimen holding region expands widthwise along an entire length of the specimen holding region from the specimen collection hole to the at least one air vent hole;

wherein the specimen holding region is configured to suck up a specimen into the specimen holding region through the specimen collection hole by capillary phenomenon when the distal end face of the base material layer is brought into contact with the specimen;

wherein the at least one air vent hole comprises a plurality of air vent holes formed in portions that are opposed to each other in respective side faces of the base material layer of the peripheral wall;

wherein the specimen holding region comprises a hexagonal shape; and wherein the specimen collection hole is formed by a first side of the hexagonal shape and the plurality of air vent holes are formed by second and third sides of the hexagonal shape, respectively.

12. A specimen collection tip with an elongated shape comprising:

a laminated structure of resin films having an elongated shape in which a length of the laminated structure in an elongated direction is greater than a width of the laminated structure in a width direction, a support part on a proximal end side of the laminated structure in the elongated direction, an open inside region formed between laminated faces of the laminated structure on a distal end side of the laminated structure in the elongated direction, a specimen collection hole constituted by an opening on the distal end side of the laminated structure in the elongated direction, a specimen holding region having a predetermined volume formed by a spreading of the inside region in the width direction from the specimen collection hole toward the proximal end side of the laminated structure in the elongated direction so that the specimen holding region is enlarged in a plan view, an air vent hole formed where a proximal end side of the specimen holding region extends to a peripheral end face of the laminated structure in the width direction, and wherein the specimen holding region expands widthwise along an entire length of the specimen holding region from the specimen collection hole to the air vent hole, and wherein the specimen holding region is configured to suck up a specimen into the specimen holding region through the specimen collection hole by capillary phenomenon when the distal end side of the laminated structure in the elongated direction is brought into contact with the specimen.

* * * * *